Sept. 28, 1948.  J. W. PAYNE ET AL  2,450,351
APPARATUS FOR WASHING GEL PELLETS
Filed March 8, 1945  2 Sheets-Sheet 1

Inventors
JOHN W. PAYNE,
PETER D. VALAS,
EDWIN H. ATWOOD AND
ERIC V. BERGSTROM
By Oswald N. Hayes
Attorney Sept. 28, 1948.　　　　J. W. PAYNE ET AL　　　　2,450,351
APPARATUS FOR WASHING GEL PELLETS
Filed March 8, 1945　　　　　　　　　　2 Sheets-Sheet 2
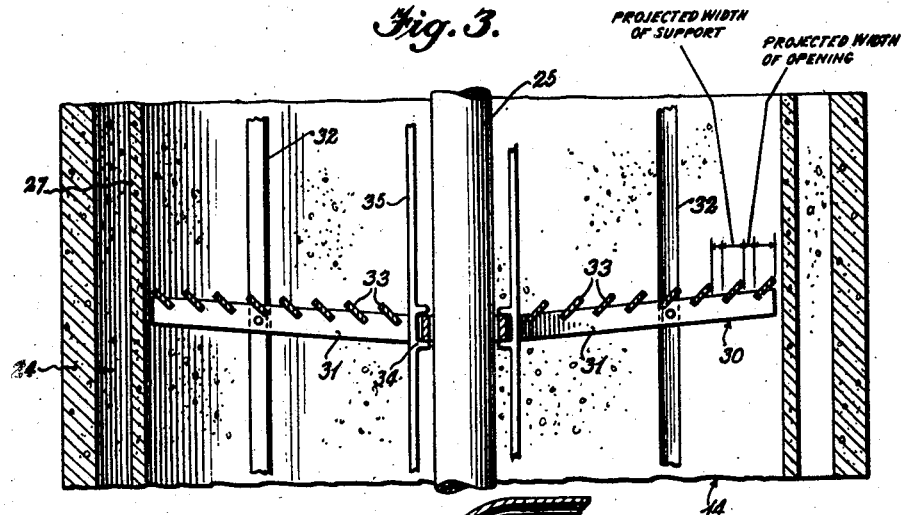
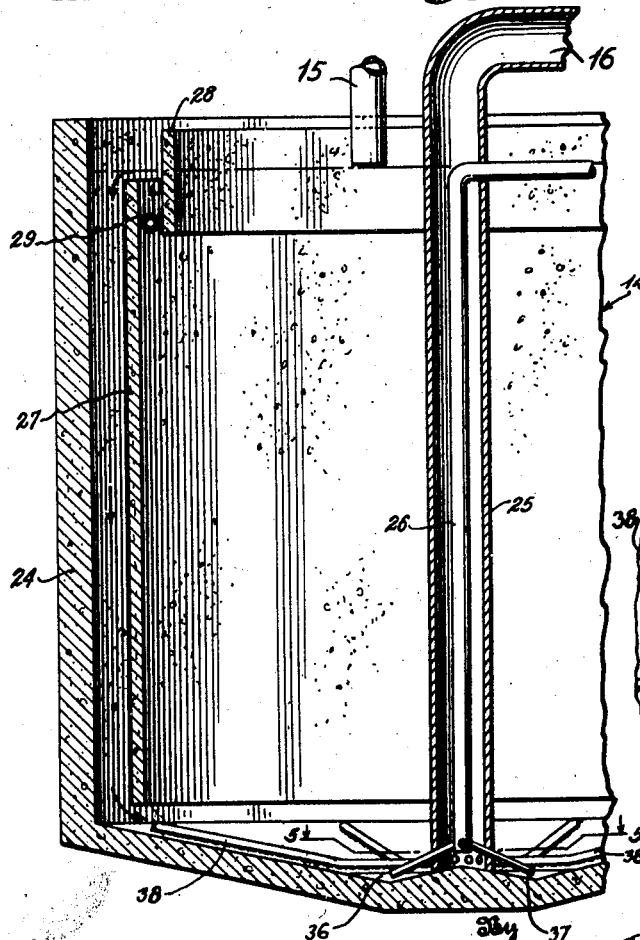
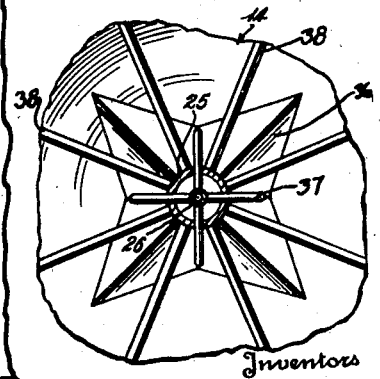
Inventors
JOHN W. PAYNE,
PETER D. VALAS,
EDWIN H. ATWOOD and
ERIC V. BERGSTROM
Oswald G. Hayes
Attorney Patented Sept. 28, 1948

2,450,351

UNITED STATES PATENT OFFICE 2,450,351

APPARATUS FOR WASHING GEL PELLETS

John W. Payne, Peter D. Valas, and Edwin H. Atwood, Woodbury, and Eric V. Bergstrom, Short Hills, N. J., assignors to Socony-Vacuum Oil Company, Incorporated, New York, N. Y., a corporation of New York Application March 8, 1945, Serial No. 581,690

11 Claims. (Cl. 134—102)

This invention relates to apparatus for the manufacture of pellets of inorganic oxide gels and is particularly concerned with means for economically and efficiently washing spheroidal gel pellets produced by gelation in a body of oil or other water immiscible liquid while retaining the physical form of the gel pellets as formed. The aforesaid gel spheroids are typified by the bead catalyst developed for use in the catalytic cracking of hydrocarbons. This catalyst, described in application Serial No. 461,454, filed October 9, 1942 by Milton M. Marisic, now Patent No. 2,385,217, dated September 18, 1945, is a composition of silica and alumina formed by injecting a silica-alumina sol into the top of a body of oil in which the sol separates into a plurality of globules, each of which sets to a firm hydrogel spheroid. The gel spheroids are then hot water treated, base exchanged to remove sodium (as by replacement with aluminum) washed with water, and dried. The resultant product is a hard glassy bead having a porous interior and a smooth surface. The discussion herein will be directed to manufacture of bead catalyst as a typical example, it being understood that the apparatus and technique are also applicable to handling other types of inorganic gels prepared for other purposes.

Prior to the invention of bead catalyst, the conventional practice was to form a gel in a large mass, break up the mass of gel into pieces of one inch maximum dimension or smaller and wash the broken fragments, which were thereafter dried to produce the desired product. For most purposes, the fragile product so obtained was tolerable. For example, in drying of gases, fragility is not a serious defect. However, the breakage and attrition to which the gel is subjected even in fixed beds is sufficient to produce substantial amounts of undesirable fines or powder. In any use where substantial relative movement of particles occurs, the irregular, jagged shapes and structural weakness of previous gels is a very serious problem. The bead catalyst meets this problem by its smooth hard surface and structural strength, arising from the fact that the form of the gel pellets is retained intact throughout the production operations.

In either technique of manufacturing gel particles, the washing step presents serious problems. For example, in making a cracking catalyst, washing periods on the order of 48 hours are generally required. Broken pieces of gel tend to compress to compact masses of their own weight in substantial depths, say a foot or more. The wet beads are much stronger and will not crush of their own weight in depths on the order of ten or twelve feet. This fact does not permit washing in deep beds on a commercial scale, however, since the beads are held in place by contact with their neighbors in deep beds and, although they may be readily washed, removal is extremely difficult. This problem is aggravated by the resilience of the wet beads, permitting some temporary deformation. It is the purpose of our invention to provide a washer for spheroidal gels in which the gel may be sluiced out in a stream of water after the washing operation has been completed. This result is accomplished by providing a washing tank of considerable depth, at least six feet, having partial supports for the mass of wet hydrogel particles at vertical intervals of two to four feet. Means are also provided to induce a flow of water along the bottom of the tank from the outside edges to a centrally disposed outlet. Other objects and advantages of the invention will be clear from the description of a preferred embodiment thereof, shown in the drawings attached hereto, wherein:

Figure 3 is a fragmentary section on line 3—3 of Figure 2;

Figure 4 is a partial elevation in section of the washer with supporting elements removed, showing in detail a preferred structure for inducing the desired circulation of water toward the center along the bottom of the washer, and Figure 5 is a fragmentary plan view showing details of the washer bottom.

Figure 1:
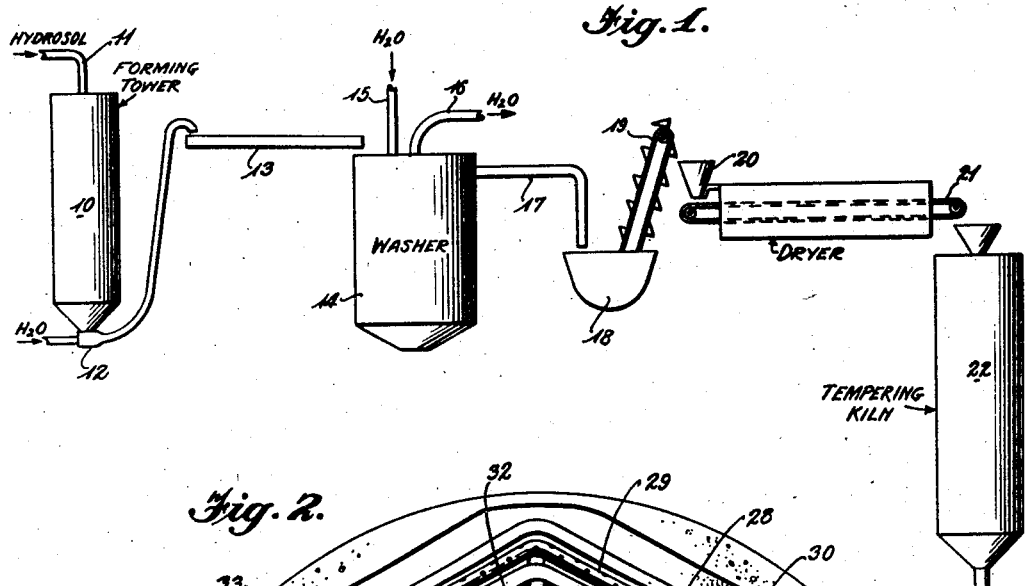
Figure 1 is a diagrammatic showing of a plant for the manufacture of bead catalyst.

Referring to Figure 1 for a showing of the complete process to which the apparatus of this invention is peculiarly adapted; the spheroidal hydrogel pellets are formed in a forming tower 10. A hydrosol having a gelation time such that it will set to a firm hydrogel in passing down through a body of oil in tower 10 is admitted by pipe 11 to an oil body of about six to eight feet in depth in tower 10. The firm hydrogel spheroids pass out the bottom of tower 10 into a stream of water in line 12 and are carried thereby to a trough 13, thence passing to washer 14. The washer is maintained full of water and the stream of water and hydrogel beads flows into the washer, excess water being withdrawn by pipe 16 to maintain the desired liquid level. Part of the water from pipe 16 is recirculated through line 12.

In the full plant there are a number of washers 14 operated in series with fresh water being supplied to the washer which has been on stream for the longest time. The discharge from each washer is supplied to the washer which was more recently placed on stream in the series, the last washer being that which was most recently filled. In preparation of cracking catalyst, it is often desirable that the freshly prepared hydrogel be heat treated for the first few hours and fresh wash water is heated for this purpose, since the presence of a base exchange agent tends to nullify the desirable heat treating effects. The base exchange operation, where necessary is accomplished by supplying a base exchange agent, such as aluminum sulfate to a suitable point in the series, preferably following the first two or three washers in the series in order that washing with water alone shall be conducted for the last period of washing.

During the washing operation, after a washer has been filled and placed in the series, wash water is admitted by pipe 15 and withdrawn by pipe 16. Upon completion of the washing operation, the washed hydrogel beads are sluiced out in a stream of water through line 17 to a sump 18 from which they are conducted by conveyor 19 to a hopper 20 feeding a continuous dryer belt 21 in a tunnel oven. Superheated steam is circulated over the hydrogel beads on belt 21 and the dry beads are then transferred to a tempering kiln 22 in which they are treated with air and steam at elevated temperature, say 1100° F. to 1400° F. The tempered beads, which are now ready for use as a cracking catalyst are conveyed to suitable devices for grading into sizes and storage or shipment.

Returning now to the washer 14, this is constituted by a suitable wall 24 which may be formed of concrete and lined with a material suitable for rendering it waterproof and reducing the possibility of abrasion of the hydrogel. A satisfactory lining for the purpose is formed by spraying a molten wax, preferably cerese wax, on the wall and then playing a flame on the wax to melt it and cause formation of a smooth coating. Several successive wax coatings may be applied in this manner to build up a layer of the desired thickness, care being exercised to avoid melting of previous layers when a successive coating is heated. This is advantageously accomplished by applying an open flame and moving it rapidly over the coated surface.

The washing in washer 14 is accomplished by a relatively slow flow of aqueous medium supplied at the top by pipe 15 and withdrawn from the bottom of the bed of hydrogel through a central well 25 by pipe 16. To obtain proper withdrawal of wash water from the bottom of the washing tank it is found desirable to provide a large number of points of withdrawal in order to accomplish the downward flow of water over a large area. This result is satisfactorily accomplished by providing a spider of withdrawal tubes 38 radiating from central well 25. The bottom surface of these tubes is constituted by screens as shown in Figure 4 thus permitting withdrawal of wash water at a very slow rate over a large area of the tubes 38. Even though the flow of water through the washing tank is at a very low rate, there is a tendency for the screens to become jammed with hydrogel unless some such means is employed. When the washing is complete and removal of washed beads desired, these are sluiced out in a stream of water of sufficeint velocity to carry the beads, through pipe 26. The pipe 26 has an outlet connected with pipe 17 not higher than the liquid level in washer 24 and suitable water flow may be induced by supply of water through pipe 15. In addition to the flow of water through the washer, during removal of product, an internal current is induced to cause flow along the bottom of the washer toward the points of gel withdrawal.

In the embodiment of Figure 4, this internal flow is induced by means working on the air lift principle. A partition 27 defines, in combination with the wall 24 of the washer 14, an annular passage. The top of partition 27 is below the liquid level in washer 14. Near the top of the washer is an annular wall 28 extending above the liquid level in washer 14 and having its lower edge a short distance below the top of partition 27. A pipe 29, lying between wall 28 and partition 27 is provided with a plurality of holes in the surfaces thereof. Air under pressure in pipe 29 flows out through the holes in the pipe 29, thus inducing a flow of water up through the space between partition 27 and wall 28, thence downwardly between wall 24 of the washer and partition 27 to flow across the bottom of the washer 14 toward the central well 25. This flow is induced when it is desired to sluice the beads from washer 14 in order to aid in discharging the beads from the washer and to inhibit hold-up of beads resting on the bottom under the weight of beads thereabove.

As shown in Figures 4 and 5, the bottom of the wash tank is sloped generally towards the center with a plurality of low points spaced around the central well. Around the central well are raised portions 36 which, in combination with the general slope of the bottom, define the low points for withdrawal of product. A product withdrawal line 37 extends from each of these low points to the pipe 26 to conduct gel out of the washing tank.

Figure 2:
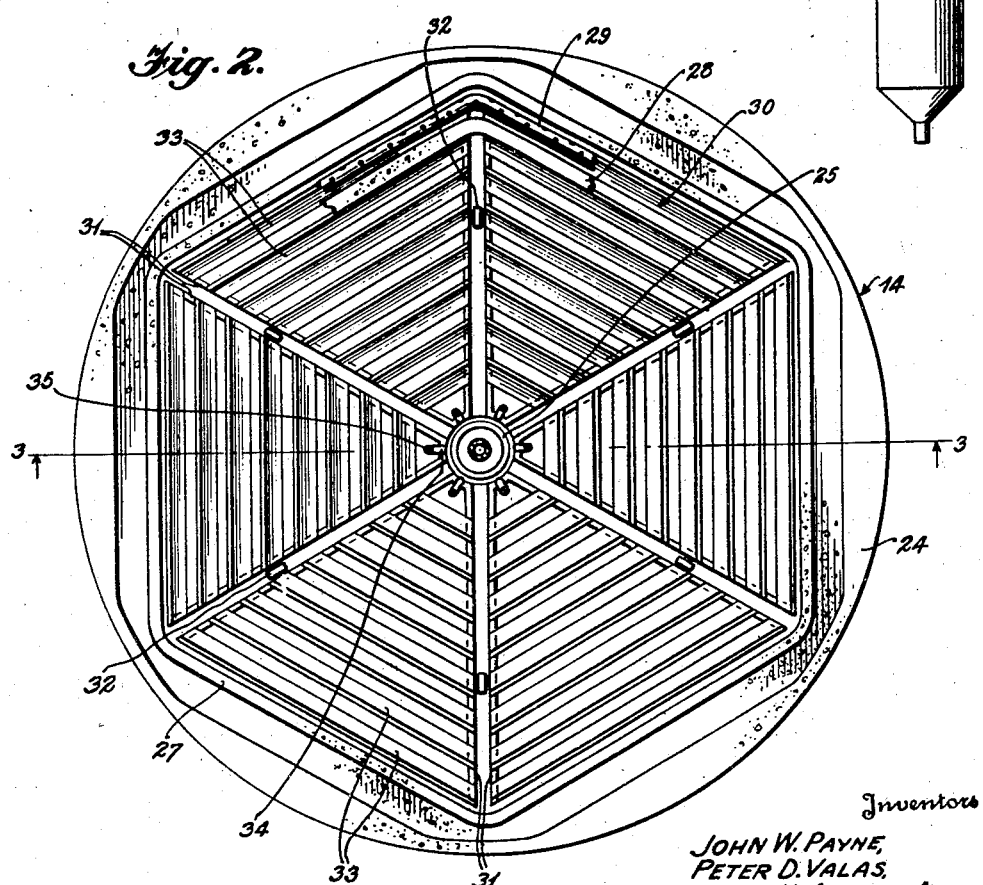
Figure 2 is a plan view of the washer of this invention.

In addition, a plurality of slatted decks 30 are provided in the washer as shown in Figures 2 and 3. In order to simplify the drawings, no attempt has been made to show the flow induction device of Figure 4 in the figures relating to decks 30, but these are preferably used in combination, the decks expediting generally downward movement of the beads during discharge and the induced circulation causing flow of beads along the bottom of the washer toward the central well 25.

The decks 30 are made up of stringers 31 mounted for motion about an axis spaced outwardly about two-thirds of the distance from well 25. In the embodiment shown, uprights 32 carry stub shafts carrying the stringers 30. A yoke 34 at the inner ends of the stringers is connected to a vertical rod 35. When it is desired to remove the washed gel, rod 35 is reciprocated, causing a rocking motion of the decks and thus aiding in downward flow of gel. The decks may be hinged at any desired point, even at the end, but the position of the hinge shown herein is preferred, since the decks are then about in balance. A plurality of slats 33 are mounted as shown on stringers 31. Proper design and spacing of the decks is essential to best operation. The vertical spacing of the decks should not be substantially greater than about three feet and closer spacing than two feet achieves no advantageous result since the decks function no better at such close spacing. The surfaces of the slats should be sloped at an angle of not substantially less than 30° to the horizontal. It is preferred to have the stringers sloped as shown in Figure 3 and to set the slats at an angle to the stringers thus increasing the slope of the slats over that of the stringers. Extremely steep sloping of the slats does not appear to give as good results as slopes on the order of 30° to 60° and this range is preferred. The upper sides of the stringers are chamfered at a similar angle to avoid build up of gel on stringers.

It is found that the projection of the opening against a horizontal plane should be less than the projection of the slats against a horizontal plane for best results and we prefer that the slats on each deck shall be equivalent in supporting effect to horizontal slats covering about two thirds the area of the deck.

The openings should, of course, be greater than the bead diameters. When a hydrosol is injected into oil, the beads formed are on the order of about ¼ to 1 inch in diameter and the openings should be at least about 3 inches but not greater than about 7 inches. It is preferred that the width of openings be about 3 to 5 inches and the projected width of slats about 6 inches. A very satisfactory arrangement is obtained by using 2 x 6 inch boards as slats set at an angle of 45° on 8 inch centers.

The most satisfactory way of operating the washer shown herein is to conduct the washing operation until the product is ready for withdrawal to further processing stages. Thereupon, the flow of wash water is halted and the outlet of pipe 17 is lowered to a point which will permit the beads to flow therefrom. As the end of the bead removal period approaches, the rods 35 are operated to move the slatted decks 31 and thus cause all the product to move downward towards the bottom of the tank for removal for processing. Operation of the air lift is not essential during the early stages of product removal but must be used during the last stages to flow beads from piles which tend to accumulate remote from the outlet points.

We claim:

1. In a washer for washing spheroidal hydrogel pellets and for sluicing washed pellets from said washer; a side wall and bottom defining a washing tank, a central well in said tank, means to withdraw a fluid stream from the bottom of said central well, means to flow a stream of washing fluid through said tank from top to bottom, an annular partition inside and spaced from said side wall having the top edge thereof below the top of said side wall and the bottom edge near said bottom of said tank, an annular wall spaced inwardly from said partition having its top edge above and its bottom edge a short distance below the said top edge of said partition, means to induce upward flow of fluid between said partition and said annular wall, a plurality of decks mounted for rocking motion about a horizontal axis spaced about two-thirds of the distance from the said well inside said partition at levels vertically spaced about two to three feet; each of said decks comprising a plurality of slats parallel to and spaced one from another to provide openings through said decks between said slats, the projected width of said slats on a horizontal plane being about six inches, and greater than the projected width of said openings, said slats having their upper surfaces inclined to the horizontal at an angle of about 30° to 60°; and means to cause rocking motion of said decks.

2. In a washer for washing spheroidal hydrogel pellets and for sluicing washed pellets from said washer; a side wall and bottom, defining a washing tank, means to withdraw a fluid stream from the bottom of said tank, means to flow a stream of washing fluid through said tank from top to bottom, an annular partition inside and spaced from said side wall having the top edge thereof below the top of said side wall and the bottom edge near said bottom of said tank, an annular wall spaced inwardly from said partition having its top edge above and its bottom edge a short distance below the said top edge of said partition, means to induce upward flow of fluid between said partition and said annular wall, a plurality of decks rockably mounted across said tank inside said partition at levels vertically spaced about two to three feet; each of said decks comprising a plurality of slats parallel to and spaced one from another to provide openings through said decks between said slats, the projected width of said slats on a horizontal plane being about six inches, and greater than the projected width of said openings, said slats having their upper surfaces inclined to the horizontal at an angle not less than about 30°; and means to cause rocking motion of said decks.

3. In a washer for washing spheroidal hydrogel pellets and for sluicing washed pellets from said washer; a side wall and bottom defining a washing tank, a central well in said tank, means to withdraw a fluid stream from the bottom of said central well, means to flow a stream of washing fluid through said tank from top to bottom, an annular partition inside and spaced from said side wall having the top edge thereof below the top of said side wall and the bottom edge near said bottom of said tank, an annular wall spaced inwardly from said partition having its top edge above and its bottom edge a short distance below the said top edge of said partition, means to induce upward flow of fluid between said partition and said annular wall, a plurality of decks rockably mounted across said tank inside said partition at levels vertically spaced about two to three feet; each of said decks comprising a plurality of slats parallel to and spaced one from another to provide openings through said decks between said slats, the projected width of said openings on a horizontal plane being about three to about seven inches and the projected width of said openings on a horizontal plane being substantially less than the projected width of said slats, said slats having their upper surfaces inclined to the horizontal at an angle of about 30° to 60°; and means to cause rocking motion of said decks.

4. In a washer for washing spheroidal hydrogel pellets and for sluicing washed pellets from said washer; a side wall and bottom defining a washing tank, a central well in said tank, means to withdraw a fluid stream from the bottom of said central well, means to flow a stream of washing fluid through said tank from top to bottom, an annular partition inside and spaced from said side wall having the top edge thereof below the top of said side wall and the bottom edge near inwardly from said partition having its top edge above and its bottom edge a short distance below the said top edge of said partition, means to induce upward flow of fluid between said partition and said annular walls, a plurality of decks rockably mounted across said tank inside said partition at levels vertically spaced about two to three feet; each of said decks comprising a plurality of slats parallel to and spaced one from another to provide openings through said decks between said slats, the projected width of said openings on a horizontal plane being about three to about seven inches and the projected width of said openings on a horizontal plane being substantially less than the projected width of said slats, said slats having their upper surfaces inclined to the horizontal at an angle not less than about 30°; and means to cause rocking motion of said decks.

5. In a washer for washing spheroidal hydrogel pellets and for sluicing washed pellets from said washers; a side wall and bottom defining a washing tank, a central well in said tank, means to withdraw a fluid stream from the bottom of said central well, means to flow a stream of washing fluid through said tank from top to bottom, means to induce a flow of liquid across the bottom of said tank toward said central well, a plurality of decks rockably mounted across said tank at levels vertically spaced about two to three feet; each of said decks comprising a plurality of slats parallel to and spaced one from another to provide openings through said decks between said slats, the projected width of said openings on a horizontal plane being about five inches, the projected width of said slats on a horizontal plane being about six inches, said slats having their upper surfaces inclined to the horizontal at an angle of about 30° to 60°; and means to cause rocking motion of said decks.

6. In a washer for washing spheroidal hydrogel pellets and for sluicing washed pellets from said washer; a side wall and bottom defining a generally circular washing tank, a central well in said tank, means to withdraw a fluid stream from the bottom of said central well, means to flow a stream of washing fluid through said tank from top to bottom, means to induce a flow of liquid across the bottom of said tank toward said central well, a plurality of decks rockably mounted across said tank at levels vertically spaced about two to three feet; each of said decks comprising a plurality of slats parallel to and spaced one from another to provide openings through said decks between said slats, the projected width of said slats on a horizontal plane being about six inches, and greater than the projected width of said openings, said slats having their upper surfaces inclined to the horizontal at an angle not less than about 30°; and means to cause rocking motion of said decks.

7. In a washer for washing spheroidal hydrogel pellets and for sluicing washed pellets from said washer; a side wall and bottom defining a washing tank, outlet means to withdraw a fluid stream containing entrained gel from the bottom of said tank, means to flow a stream of washing fluid through said tank from top to bottom, means to induce a flow of liquid across the bottom of said tank toward said outlet means, a plurality of decks rockably mounted across said tank at levels vertically spaced about two to three feet; each of said decks comprising a plurality of slats parallel to and spaced one from another to provide openings through said decks between said slats, the projected width of said openings on a horizontal plane being about three to about seven inches and the projected width of said openings on a horizontal plane being substantially less than the projected width of said slats, said slats having their upper surfaces inclined to the horizontal at an angle of about 30° to 60°; and means to cause vertical reciprocation of the outer edges of said decks.

8. In a washer for washing spheroidal hydrogel pellets and for sluicing washed pellets from said washer; a side wall and bottom defining a washing tank, a central well in said tank, means to withdraw a fluid stream from the bottom of said central well, means to flow a stream of washing fluid through said tank from top to bottom, means to induce a flow of liquid across the bottom of said tank toward said central well, a plurality of decks rockably mounted across said tank at levels vertically spaced about two to three feet; each of said decks comprising a plurality of slats parallel to and spaced one from another to provide openings through said decks between said slats, the projected width of said openings on a horizontal plane being about three to about seven inches and the projected width of said openings on a horizontal plane being substantially less than the projected width of said slats, said slats having their upper surfaces inclined to the horizontal at an angle not less than about 30°; and means to cause rocking motion of said decks.

9. In a washer for washing spheroidal hydrogel pellets and for sluicing washed pellets from said washer; a side wall and bottom defining a washing tank, a central well in said tank, means to withdraw a fluid stream from the bottom of said central well, means to flow a stream of washing fluid through said tank from top to bottom, means to induce a flow of liquid across the bottom of said tank toward said central well, and a plurality of decks across said tank at levels vertically spaced about two to three feet; each of said decks comprising a plurality of slats parallel to and spaced one from another to provide openings through said decks between said slats, the projected width of said openings on a horizontal plane being about three to about seven inches and the projected width of said openings on a horizontal plane being substantially less than the projected width of said slats, said slats having their upper surfaces inclined to the horizontal at an angle not less than about 30°.

10. In a washer for washing spheroidal hydrogel pellets and for sluicing washed pellets from said washer; a side wall and bottom defining a washing tank, a central well in said tank, means to withdraw a fluid stream from the bottom of said central well, means to flow a stream of washing fluid through said tank from top to bottom, means to induce a flow of liquid across the bottom of said tank toward said central well, and a plurality of decks across said tank at levels vertically spaced about two to three feet; each of said decks comprising a plurality of slats parallel to and spaced one from another to provide openings through said decks between said slats, said slats having their upper surfaces inclined to the horizontal at an angle not less than about 30°.

11. In a washer for washing spheroidal hydrogel pellets and for sluicing washed pellets from said washer; a side wall and bottom defining a washing tank, a central well in said tank, means to withdraw a fluid stream from the bottom of said central well, means to flow a stream of washing fluid through said tank from top to bottom, means to induce a flow of liquid across the bottom of said tank toward said central well, a plurality of decks rockably mounted across said tank at levels vertically spaced about two to three feet; each of said decks comprising a plurality of slats parallel to and spaced one from another to provide openings through said decks between said slats; and means to cause rocking motion of said decks.

JOHN W. PAYNE.
PETER D. VALAS.
EDWIN E. ATWOOD.
ERIC V. BERGSTROM.

REFERENCES CITED

The following references are of record in the file of this patent:

UNITED STATES PATENTS

| Number | Name | Date |
|---|---|---|
| 1,295,470 | Fisher | Feb. 25, 1919 |
| 1,602,014 | Graham et al. | Oct. 5, 1926 |
| 1,754,870 | Wickes | Aug. 15, 1930 |

Certificate of Correction

Patent No. 2,450,351.    September 28, 1948.

JOHN W. PAYNE ET AL.

It is hereby certified that errors appear in the printed specification of the above numbered patent requiring correction as follows:

Column 4, line 19, for "goints" read *points*; column 7, line 22, claim 5, for "washers" read *washer*;

and that the said Letters Patent should be read with these corrections therein that the same may conform to the record of the case in the Patent Office.

Signed and sealed this 10th day of May, A. D. 1949.

[SEAL]

THOMAS F. MURPHY,
*Assistant Commissioner of Patents.*